(12) United States Patent
Lorieau

(10) Patent No.: US 6,226,514 B1
(45) Date of Patent: May 1, 2001

(54) TELEPHONY DEVICE COMPRISING A BASE STATION AND AT LEAST ONE HANDSET AND METHOD OF CONNECTING SUCH A TELEPHONY DEVICE

(75) Inventor: Christophe Lorieau, Guecelard (FR)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/100,831

(22) Filed: Jun. 19, 1998

(30) Foreign Application Priority Data

Jun. 24, 1997 (FR) .................................................. 97 07860

(51) Int. Cl.⁷ ............................. H04M 3/42; H04M 3/00
(52) U.S. Cl. ........................................... 455/419; 455/414
(58) Field of Search ..................................... 455/462, 414, 455/419, 418, 466, 575, 550, 561, 436, 465, 420, 558; 379/88.06, 157

(56) References Cited

U.S. PATENT DOCUMENTS

| | | | |
|---|---|---|---|
| 5,249,217 | * 9/1993 | Lee ........................................ | 379/58 |
| 5,659,598 | * 8/1997 | Byrne et al. ........................... | 455/436 |
| 5,771,468 | * 6/1998 | Stein ...................................... | 455/561 |
| 5,794,142 | * 8/1998 | Vanttila et al. ........................ | 455/419 |
| 5,956,655 | * 9/1999 | Suzuki et al. ..................... | 455/575 X |
| 6,023,620 | * 2/2000 | Hansson ................................ | 455/419 |
| 6,029,065 | * 2/2000 | Shah ...................................... | 455/419 |

FOREIGN PATENT DOCUMENTS

4237395C1    2/1994   (DE) ................................ H04M/1/00

* cited by examiner

Primary Examiner—Tracy Legree
(74) Attorney, Agent, or Firm—Dicran Halajian

(57) ABSTRACT

A method and apparatus for changing the language of the menus in a telephony device formed by a base station and a plurality of handsets. The handset sends a change-language order to the base station. The base station acknowledges receipt of the order and the handset which has formulated the order then modifies it change of language. The base station can also send such orders to other handset which are connected to the base station.

11 Claims, 2 Drawing Sheets

TELEPHONY DEVICE COMPRISING A BASE STATION AND AT LEAST ONE HANDSET AND METHOD OF CONNECTING SUCH A TELEPHONY DEVICE

FIELD OF THE INVENTION

The invention relates to a telephony device comprising a set of elements formed by:
a base station having, inter alia:
* a processor assembly,
* a memory containing an execution program, and
* a random access memory,
at least one handset having, inter alia:
* a display,
* a processor assembly,
* control means for modifying at least one service inside one of said elements,
transmission means for transmitting messages between the base station and the handsets.

The invention relates to a handset and a base station suitable for such a telephony device.

The invention also relates to a method implemented in such a telephony device and also relates to a handset and a base station suitable for such a telephony device.

The invention finds interesting applications in telecommunication systems implying protocols, which is notably the case with telephony devices satisfying the DECT standard, for example.

BACKGROUND OF THE INVENTION

According to this standard, it is possible by means of a handset to have the base station carry out orders. According to known techniques, this is called the transparent mode for programming various services to be carried out by the base station.

Because of the fact that one works by means of controls which are keyed in on the keyboard of handsets and which are then transmitted by radio channels which are likely to fade, one is not certain that the requested operation is suitably executed.

SUMMARY OF THE INVENTION

The present invention proposes a device as defined in the opening paragraph which ensures a better control of the base station from handsets.

Therefore, such a device is characterized in that it further comprises:
transmission means for transmitting to at least one of said elements an order to carry out a service.

The idea of the invention consists of pre-establishing the tasks to be carried out at the level of the base station so that, in response to a single information signal of executing an order, the base station executes this order.

These and other aspects of the invention will be apparent from and elucidated with reference to the embodiments described hereinafter.

DETAILED DESCRIPTION OF THE INVENTION

Figure 1:
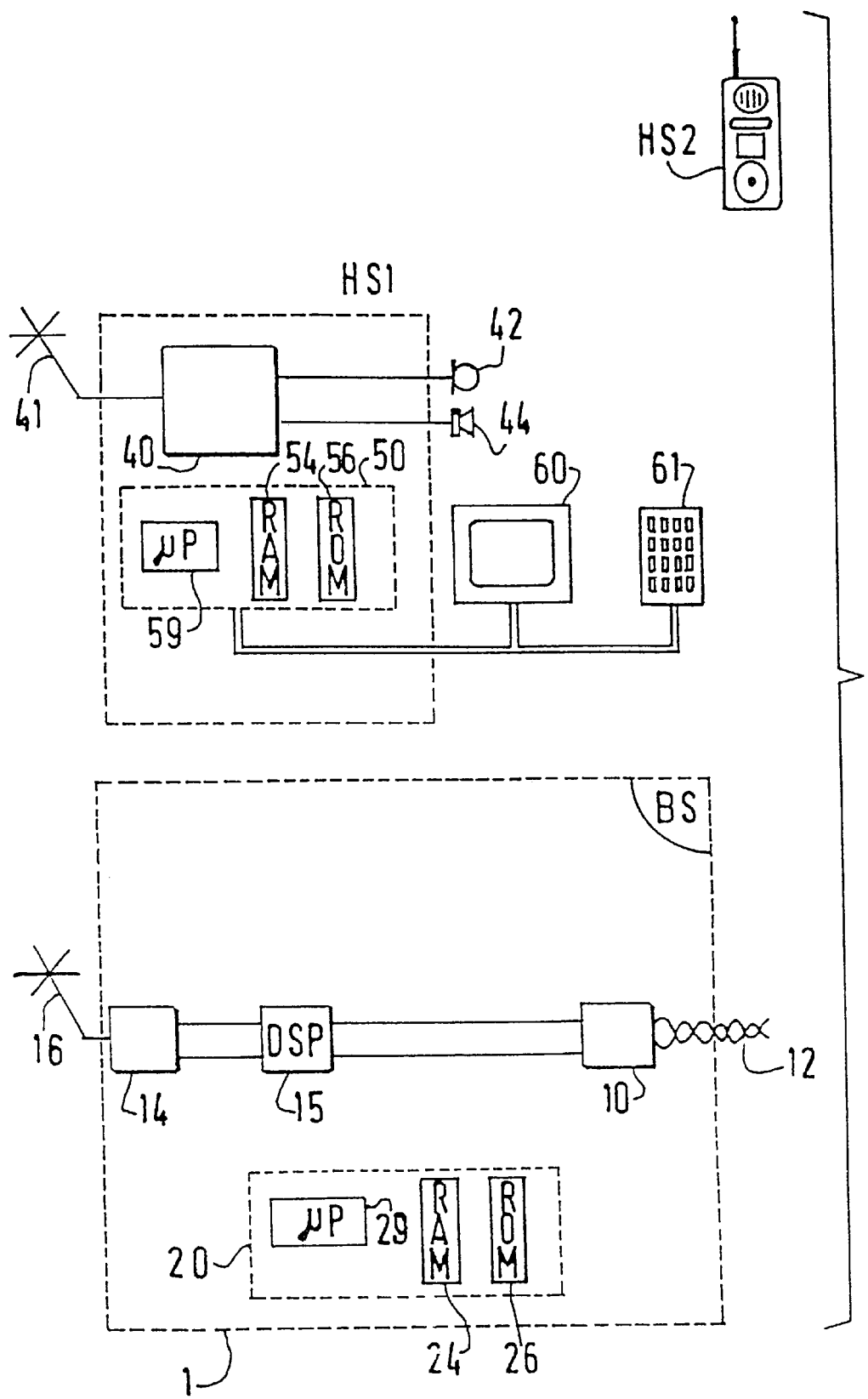
FIG. 1 shows a telephony device according to the invention.

In FIG. 1, the telephony device which is represented is a device satisfying the DECT standards. Reference 1 shows the base station BS to which may be connected by radio a plurality of handsets HS1, HS2, . . . This base station 1 comprises, inter alia, a line circuit 10 which makes it possible for the base station to be connected to the switched network by a telephone line 12 and a radio circuit 14 which authorizes the dialogue with the various handsets HS1, HS2, . . . , by transmitting and receiving waves by an antenna 16. For processing all the information signals of analog type which flow inside the basic circuit, a signal processing element 15 is provided formed by a signal processor DSP which processes notably speech signals to transform them into digital signals.

All the elements of this base station 1 are managed by a microprocessor assembly 20. This element is notably formed in usual manner by a random-access memory 24, a read-only memory 26 containing the operating instructions of the device and by a management processor 29.

The handset HS1, the only one shown in detail (the handset HS2 may be of identical structure), comprises a communication assembly 40 which includes an antenna 41 which makes it possible for the handset to communicate with the base station BS and from there with the other handsets HS2, . . . This assembly processes the information signals coming from the microphone 42 and also produces the signals for a loudspeaker 44. Also provided are a management element 50 formed by, just like the microprocessor assembly 20, a random-access memory 54, a read-only memory 56 containing the operating instructions of the device and by a management processor 59. The handset HS1 also includes a display 60 on which various information signals are shown and a keyboard 61. These handsets are mobiles and are hence supplied with power by an accumulator which is not shown in FIG. 1. On the display 60 may appear menus which the user may cause to appear by means of the keys of the keyboard 61. The user may also validate an item of this menu by acting on a key.

An interesting application for which the invention can be used is the change of languages of the menus. These menus wording may be issued both from the handsets and the base station.

Figure 2:
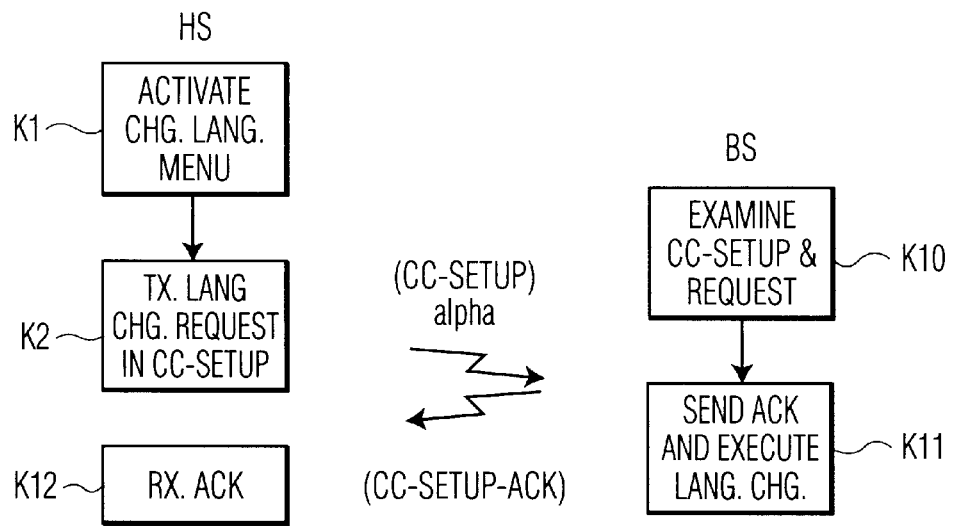
FIG. 2 shows a diagram explaining the operation of the telephony device to modify a service at the level of the base station.

According to the invention, the user, on his handset, activates the menu relating to this operation represented in box K1 of FIG. 2. The next operation consists of implementing this change of language in the base station BS. For this purpose, a link is established by launching the procedure {CC-SETUP} as described in the standard DECT ETS 300 175-5 in paragraph 9.3 (box K2). With this procedure an information signal "alpha" is added which indicates the work to be carried out by the base station BS.

The base station receiving this {CC-SETUP} examines the message (box K10) and sends back a reception acknowledgement signal {CC-SETUP-ACK}. Then the base station changes language in accordance with the information "alpha" (box K11).

The handset tests the arrival of {CC-SETUP-ACK}. If this information has not arrived, the user knows that his change of language has probably not been carried out properly. If the acknowledgement of reception has indeed been received, the change of language is finally carried out in the handset (box K12). Then, thanks to the invention, it is thus practically certain that the task has been carried out properly.

Figure 3:
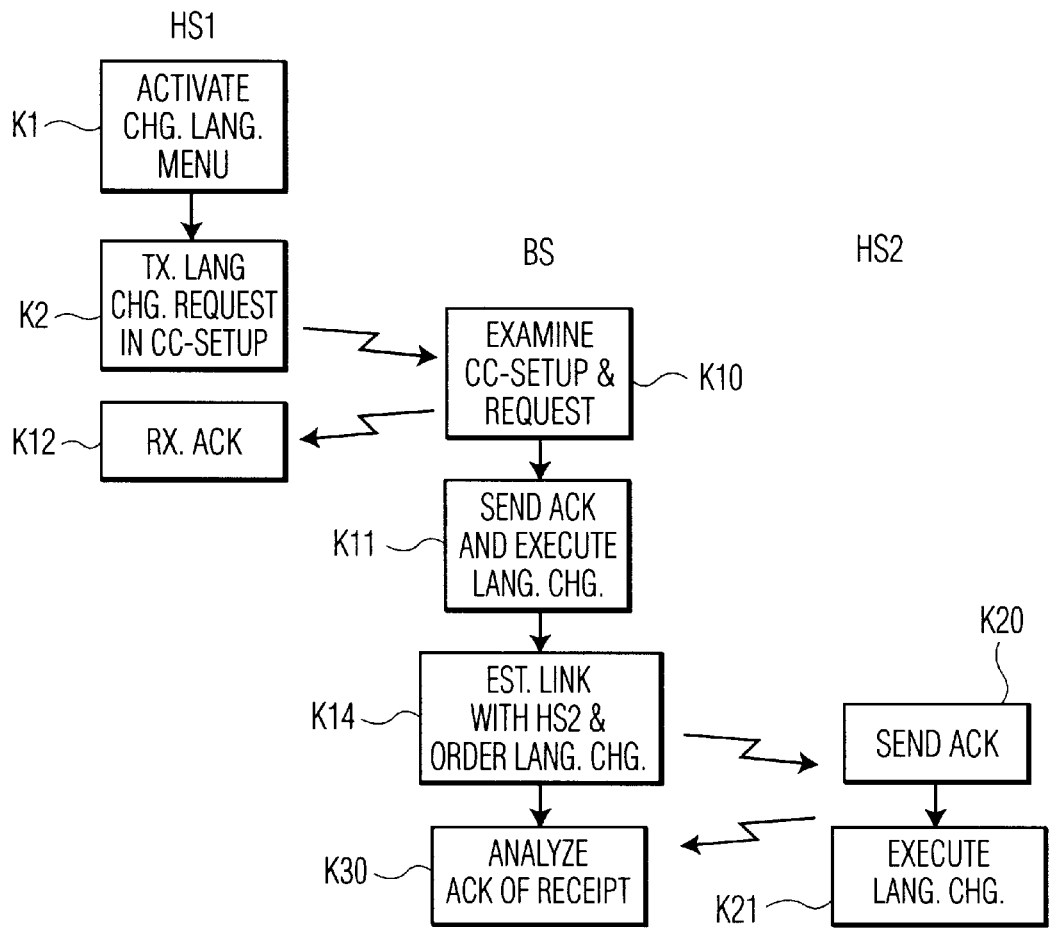
FIG. 3 shows a diagram explaining the operation of the device to modify a service at the level of the base station and at the level of at least one handset.

The process that has just been described may be generalized to changes of languages of other handsets connected to this same base station BS. As this is shown in FIG. 3, the operations indicated in this Figure are the same as those shown in FIG. 2 and carry like references. The base station establishes a link to another handset HS2 (box K14). The latter handset sends back an acknowledgement of receipt (box K20) and undertakes the task requested from it by the link (box K21). The base station analyses (box K30) the acknowledgement of receipt. If this acknowledgement indicates that everything is normal, another handset may be contacted. If not, one will try to contact this mobile at a later instant and one will thus be in a position to contact the next handset.

What is claimed is:

1. A method of changing a service in a telephony device having a handset and a base station comprising:

establishing a link between said handset and said base station;

requesting a change of said service;

transmitting through said link an order to change said service from said handset to said base station, said order changing language of menus; and transmitting by said base station a further order to a further handset to carry out said service in response to receipt of said order from said handset.

2. The method of claim 1, further comprising transmitting an acknowledge signal in response to receipt of said order.

3. The method of claim 2 further comprising, after the act of transmitting the acknowledge signal, changing said service in said base station.

4. The method of claim 2, further comprising changing said service in said handset in response to receipt of said acknowledge signal.

5. The method of claim 1 further comprising changing said service by said further handset after transmitting to said base station an acknowledge signal in response to receipt of said further order from said base station.

6. The method of claim 5 further comprising transmitting by said base station another order to another handset to carry out said service after receipt of said acknowledge signal from said further handset.

7. A communication device comprising:

a base station having a memory which stores pre-established tasks; and a handset for communication with said base station; said handset providing an order to said base station to execute said pre-established tasks to carry out a service; wherein said pre-established tasks are executed by said base station after transmitting to said handset an acknowledge signal in response to receipt of said order from said handset; and a further handset, said base station providing a further order to said further handset to carry out said service, wherein said service is changed by said further handset after transmitting to said base station a further acknowledge signal in response to receipt of said further order from said base station.

8. The communication device of claim 7, wherein said service includes changing languages of menus.

9. The communication device of claim 7, wherein said service is changed by said handset after receipt of said acknowledge signal.

10. The communication device of claim 7, wherein said base station provides another order to another handset to carry out said service after receipt of said further acknowledge signal from said further handset.

11. A communication device comprising:

a base station; and a first handset and a second handset for communication with said base station; wherein said first handset provides an order to said base station to change a service from said first handset to said base station, said order changing language of menus; and wherein said base station transmits a further order to said second handset to carry out said service in response to receipt of said order from said first handset.

* * * * *